United States Patent
Zhang et al.

(10) Patent No.: US 11,558,150 B2
(45) Date of Patent: Jan. 17, 2023

(54) REPEATED TRANSMISSION METHOD AND APPARATUS

(71) Applicant: HUAWEI TECHNOLOGIES CO., LTD., Guangdong (CN)

(72) Inventors: Lei Zhang, Shenzhen (CN); Lei Wang, Shanghai (CN); Yan Chen, Shanghai (CN); Yiqun Wu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 109 days.

(21) Appl. No.: 17/094,466

(22) Filed: Nov. 10, 2020

(65) Prior Publication Data

US 2021/0058193 A1  Feb. 25, 2021

Related U.S. Application Data

(63) Continuation of application No. PCT/CN2019/086709, filed on May 13, 2019.

(30) Foreign Application Priority Data

May 11, 2018  (CN) .......................... 201810459923.1

(51) Int. Cl.
| | |
|---|---|
| *H04L 5/00* | (2006.01) |
| *H04L 1/08* | (2006.01) |
| *H04W 52/06* | (2009.01) |
| *H04W 52/36* | (2009.01) |

(52) U.S. Cl.
CPC .............. *H04L 1/08* (2013.01); *H04L 5/0048* (2013.01); *H04W 52/06* (2013.01); *H04W 52/36* (2013.01)

(58) Field of Classification Search
CPC ........ H04L 1/08; H04L 5/0048; H04W 52/06; H04W 52/36
See application file for complete search history.

(56) References Cited

U.S. PATENT DOCUMENTS

| | | | |
|---|---|---|---|
| 8,761,824 B2* | 6/2014 | Palanki ................ | H04L 5/0007 455/456.2 |
| 10,736,044 B2* | 8/2020 | Ryu ..................... | H04W 16/28 |

(Continued)

FOREIGN PATENT DOCUMENTS

| | | |
|---|---|---|
| CN | 101114852 A | 1/2008 |
| CN | 101286772 A | 10/2008 |

(Continued)

OTHER PUBLICATIONS

Lenovo et al,"UL grant-free transmission for URLLC",3GPP TSG RAN WG1 Meeting #88bis, R1-1705654, Spokane, USA Apr. 3-7, 2017, total 4 pages.

(Continued)

*Primary Examiner* — Fahmida S Chowdhury
(74) *Attorney, Agent, or Firm* — Womble Bond Dickinson (US) LLP

(57) ABSTRACT

Embodiments of this disclosure relate to the communications field, and provide a repeated transmission method and an apparatus, to increase a probability of successful decoding of a user equipment. The method includes: performing, by a user equipment, first transmission of uplink data, and sending a first reference signal to a network device based on a first transmit power, where the first reference signal is used to demodulate the first transmission of the uplink data; and performing, by the user equipment, $N^{th}$ transmission of the uplink data, and sending a second reference signal to the network device based on a second transmit power, where N is an integer greater than or equal to 2, the second reference signal is used to demodulate the $N^{th}$ transmission of the uplink data, and the second transmit power is less than the first transmit power.

19 Claims, 11 Drawing Sheets

(56) References Cited

U.S. PATENT DOCUMENTS

| | | | |
|---|---|---|---|
| 2006/0221885 A1* | 10/2006 | Nagaraj | H04W 52/322 |
| | | | 370/465 |
| 2011/0261741 A1 | 10/2011 | Matsumoto et al. | |
| 2012/0076066 A1 | 3/2012 | Lee | |
| 2016/0192299 A1 | 6/2016 | Chen | |
| 2017/0295589 A1* | 10/2017 | Sundararajan | H04L 25/08 |
| 2018/0103433 A1* | 4/2018 | Li | H04W 52/42 |
| 2018/0359711 A1* | 12/2018 | Akkarakaran | H04W 52/42 |
| 2018/0368081 A1* | 12/2018 | Akkarakaran | H04W 52/242 |
| 2020/0059867 A1* | 2/2020 | Haghighat | H04W 52/262 |

FOREIGN PATENT DOCUMENTS

| | | |
|---|---|---|
| CN | 101951643 A | 1/2011 |
| CN | 104902551 A | 9/2015 |
| WO | 2015084093 A1 | 6/2015 |
| WO | 2016070784 A1 | 5/2016 |
| WO | 2016073591 A1 | 5/2016 |
| WO | 2016172174 A1 | 10/2016 |

OTHER PUBLICATIONS

3GPP TS 38.214 V15.0.0 (Dec. 2017), 3rd Generation Partnership Project; Technical Specification Group Radio Access Network; NR; Physical layer procedures for data (Release 15), 71 pages.

3GPP TS 38.214 V15.1.0 (Mar. 2018), 3rd Generation Partnership Project; Technical Specification Group Radio Access Network; NR; Physical layer procedures for data (Release 15), 77 pages.

Qualcomm Incorporated, DMRS overhead reduction. 3GPP TSG-RAN WG1 #90bis, 9th Oct. 13, 2017, Prague, Czechia, R1-1718132, 2 pages.

* cited by examiner

First type of DMRS pattern
(a)

Second type of DMRS pattern
(b)

REPEATED TRANSMISSION METHOD AND APPARATUS

CROSS-REFERENCE TO RELATED APPLICATIONS

This application is a continuation of International Application No. PCT/CN2019/086709, filed on May 13, 2019, which claims priority to Chinese Patent Application No. 201810459923.1, filed on May 11, 2018, The disclosures of the aforementioned applications are hereby incorporated by reference in their entireties.

TECHNICAL FIELD

This disclosure relates to the communications field, and in particular, to a repeated transmission method and an apparatus.

BACKGROUND

In a third generation (3-generation, 3G) mobile communication technology or a fourth generation (4-generation, 4G) mobile communication technology, a grant-based mode is usually used for uplink transmission, to be specific, a user equipment (UE) requests a transmission resource and a transmission parameter from a base station before the uplink transmission, and the base station determines the transmission resource and the transmission parameter based on the request, and delivers the transmission resource and the transmission parameter to the user equipment by using control signaling. In fifth generation (5-generation, 5G) mobile communication technology communication, the industry proposes a new transmission mode, namely, uplink transmission without dynamic scheduling, which is also referred to as uplink transmission without dynamic grant, or uplink transmission with configured grant, or grant-free uplink transmission. In the uplink transmission without dynamic scheduling mode, the user equipment does not need to request a scheduling resource from the base station before sending data, while directly sending service data by using a time-frequency resource pre-configured by the base station. In this way, signaling overheads may be greatly reduced, and an access delay may be shortened. In the uplink transmission without dynamic scheduling mode, to improve reliability, the user equipment sends uplink data in a repeated (repetition) transmission manner, to be specific, the user equipment may repeatedly send a same data packet for K times, where K is an integer greater than 0. Each time the user equipment sends the data packet, the user equipment also sends a pilot. The base station determines, by detecting the pilot, whether the user equipment transmits the data packet in a current subframe.

An existing communications protocol (for example, the 3GPP 38.214 protocol) specifies a transmission opportunity (TO) in which the user equipment can perform initial transmission in repeated transmission in a transmission periodicity P. For example, when a redundancy version (RV) sequence is {0, 0, 0, 0} or {0, 3, 0, 3}, the initial transmission in the repeated transmission may start from a TO in which an RV 0 in the transmission periodicity P is located. In the uplink transmission without dynamic scheduling mode, when time-frequency resources probably pre-configured by the base station for different UEs are the same or overlap, a collision may occur between initial transmission and retransmission of the different UEs. As shown in FIG. 1, an example in which the RV sequence configured by the base station is {0, 3, 0, 3} is used. FIG. 1 is a schematic diagram in which initial transmission of a UE 2 collides with retransmission of a UE 1. A pilot that is sent by the UE 2 and that is used for the initial transmission is interfered by a pilot that is sent by the UE 1 and that is used for the retransmission, and this affects detection performed by the base station on the initial transmission of the UE 2.

Because decoding reliability of initial transmission of the UE is the highest, when initial transmission of one UE collides with retransmission of another UE, detection reliability of the initial transmission of the UE may be reduced. Consequently, a probability of successful decoding of the UE is reduced.

SUMMARY

Embodiments of this disclosure provide a repeated transmission method and an apparatus, to increase a probability of successful decoding of initial transmission sent by a user equipment.

An embodiment of this disclosure provides a repeated transmission method, including: performing, by a user equipment, first transmission of uplink data, and sending a first reference signal to a network device based on a first transmit power, where the first reference signal is used to demodulate the first transmission of the uplink data; and performing, by the user equipment, $N^{th}$ transmission of the uplink data, and sending a second reference signal to the network device based on a second transmit power, where N is an integer greater than or equal to 2, the second reference signal is used to demodulate the $N^{th}$ transmission of the uplink data, and the second transmit power is less than the first transmit power. The first transmission of the uplink data is initial transmission of the uplink data, and the first reference signal sent based on the first transmit power is an initially transmitted reference signal. The $N^{th}$ transmission of the uplink data is $(N-1)^{th}$ retransmission of the uplink data, and the second reference signal sent to the network device based on the second transmit power is a reference signal retransmitted at the $(N-1)^{th}$ time.

In the prior art, initial transmission of a user equipment collides with retransmission of another user equipment, and this may reduce detection reliability of the initial transmission of the user equipment. Consequently, a probability of successful decoding of the user equipment is reduced. Compared with the prior art, in this embodiment of this disclosure, a transmit power of a reference signal initially transmitted by the user equipment is greater than a transmit power of a retransmitted reference signal. For each user equipment, impact of a reference signal retransmitted by the another user equipment on the reference signal initially transmitted by the user equipment is reduced, thereby increasing a probability of successful decoding of the reference signal initially transmitted by the user equipment, that is, increasing a probability of successful decoding of the user equipment.

In an embodiment, the user equipment controls the first transmission of the uplink data based on a third transmit power; and the user equipment controls the $N^{th}$ transmission of the uplink data based on a fourth transmit power, where the third transmit power is the same as or different from the fourth transmit power.

In an embodiment, the third transmit power is greater than the fourth transmit power. Because decoding reliability of the initial transmission of the user equipment is the highest, the transmit power corresponding to the first transmission is greater than the transmit power corresponding to the $N^{th}$ transmission of the uplink data, so that the network device better receives the first transmission of the uplink data, thereby improving the decoding reliability of the user equipment.

In an embodiment, the first transmit power is the same as the third transmit power, or the first transmit power is greater than the third transmit power.

Because a base station demodulates the first transmission of the uplink data based on the first transmit power of the reference signal, the first transmit power is greater than the third transmit power, so that the network device better demodulates the first transmission of the uplink data.

In an embodiment, the second transmit power is the same as the fourth transmit power, or the second transmit power is less than the fourth transmit power.

It should be noted that, for each user equipment, a lower second transmit power can better reduce the impact of the reference signal retransmitted by the another user equipment on the reference signal initially transmitted by the user equipment, so that the user equipment better performs the first transmission of the uplink data, and can improve the decoding reliability of the initial transmission of the user equipment, thereby improving the decoding reliability of the user equipment.

In an embodiment, the method further includes: performing, by the user equipment, $(N+1)^{th}$ transmission of the uplink data, and sending a third reference signal based on a fifth transmit power, where the third reference signal is used to demodulate the $(N+1)^{th}$ transmission of the uplink data, and the fifth transmit power is the same as or different from the second transmit power.

In an embodiment, the fifth transmit power is less than the second transmit power. Therefore, compared with impact of the reference signal retransmitted based on the second transmit power on the initially transmitted reference signal, impact of the reference signal retransmitted based on the fifth transmit power on the initially transmitted reference signal is smaller, so that the network device better receives the first transmission of the uplink data, and can improve the decoding reliability of the initial transmission of the user equipment, thereby improving the decoding reliability of the user equipment.

In an embodiment, the user equipment performs the $(N+1)^{th}$ transmission of the uplink data based on a sixth transmit power. The sixth transmit power is the same as or different from the fourth transmit power. To be specific, the transmit power of the uplink data transmitted at the $(N+1)^{th}$ time may be the same as or different from the transmit power of the uplink data transmitted at the $N^{th}$ time. In a possible design, the sixth transmit power is less than the fourth transmit power.

In an embodiment, the first transmit power is determined based on a maximum transmit power of the user equipment, an expected target power value, an open-loop power control parameter, a power offset value of a modulation and coding scheme MCS, and a closed-loop power control adjustment amount that are of an uplink channel, and transmission bandwidth allocated to the user equipment; and the expected target power value of the uplink channel is determined based on a first parameter, a cell reference power, and a power offset of the user equipment, and the first parameter is used to determine a value of the power offset of the user equipment, so that a value of the first transmit power can be adjusted.

In an embodiment, the first transmit power is determined based on a second parameter, a maximum transmit power of the user equipment, an expected target power value, an open-loop power control parameter, a power offset value of a modulation and coding scheme MCS, and a closed-loop power control adjustment amount that are of an uplink channel, and transmission bandwidth allocated to the user equipment; and the second parameter is determined by the user equipment or the network device.

In an embodiment, a value of another parameter that affects the first transmit power may be adjusted by using a third parameter, to further adjust the value of the first transmit power. This is not limited in this embodiment of this disclosure.

In an embodiment, the first transmit power is determined based on power boosting factors of the third transmit power and the first transmit power; and the second transmit power is determined based on power boosting factors of the fourth transmit power and the second transmit power.

In an embodiment, a sending power of a reference signal corresponding to $i^{th}$ transmission of the uplink data is determined based on a redundancy version number used for the $i^{th}$ transmission of the uplink data, where i=1, . . . , K, and K is a maximum quantity of times of repeated transmission.

In this way, a value of the sending power of the reference signal corresponding to the $i^{th}$ transmission may be determined based on the redundancy version number used for the $i^{th}$ transmission of the uplink data, to ensure that the transmit power of the reference signal initially transmitted by the user equipment is greater than the transmit power of the retransmitted reference signal. For each user equipment, the impact of the reference signal retransmitted by the another user equipment on the reference signal initially transmitted by the user equipment is reduced, thereby increasing the probability of successful decoding of the reference signal initially transmitted by the user equipment, that is, increasing the probability of successful decoding of the user equipment.

In an embodiment, parameter information of at least one of the first transmit power to the fifth transmit power is configured by using a radio resource control (RRC) message and/or downlink control information (DCI).

An embodiment of this disclosure provides a user equipment, including: a transmission unit, configured to: perform first transmission of uplink data, and send a first reference signal to a network device based on a first transmit power, where the first reference signal is used to demodulate the first transmission of the uplink data; and the transmission unit, further configured to: perform $N^{th}$ transmission of the uplink data, and send a second reference signal to the network device based on a second transmit power, where N is an integer greater than or equal to 2, the second reference signal is used to demodulate the $N^{th}$ transmission of the uplink data, and the second transmit power is less than the first transmit power.

In an embodiment, the transmission unit is configured to control the first transmission of the uplink data based on a third transmit power; and the transmission unit is configured to control the $N^{th}$ transmission of the uplink data based on a fourth transmit power, where the third transmit power is the same as or different from the fourth transmit power.

In an embodiment, the first transmit power is the same as the third transmit power, or the first transmit power is greater than the third transmit power.

In an embodiment, the second transmit power is the same as the fourth transmit power, or the second transmit power is less than the fourth transmit power.

In an embodiment, the transmission unit is further configured to: perform $(N+1)^{th}$ transmission of the uplink data, and send a third reference signal based on a fifth transmit power, where the third reference signal is used to demodulate the $(N+1)^{th}$ transmission of the uplink data, and the fifth transmit power is the same as or different from the second transmit power.

In an embodiment, the first transmit power is determined based on a maximum transmit power of the user equipment, an expected target power value, an open-loop power control parameter, a power offset value of a modulation and coding scheme MCS, and a closed-loop power control adjustment amount that are of an uplink channel, and transmission bandwidth allocated to the user equipment; and the expected target power value of the uplink channel is determined based on a first parameter, a cell reference power, and a power offset of the user equipment, and the first parameter is used to determine a value of the power offset of the user equipment.

In an embodiment, the first transmit power is determined based on a second parameter, a maximum transmit power of the user equipment, an expected target power value, an open-loop power control parameter, a power offset value of a modulation and coding scheme MCS, and a closed-loop power control adjustment amount that are of an uplink channel, and transmission bandwidth allocated to the user equipment; and the second parameter is determined by the user equipment or the network device.

In an embodiment, the first transmit power is determined based on power boosting factors of the third transmit power and the first transmit power; and the second transmit power is determined based on power boosting factors of the fourth transmit power and the second transmit power.

In an embodiment, a sending power of a reference signal corresponding to $i^{th}$ transmission of the uplink data is determined based on a redundancy version number used for the $i^{th}$ transmission of the uplink data, where $i=1, \ldots, K$, and K is a maximum quantity of times of repeated transmission.

For technical effects of the second aspect and various possible implementations of the second aspect, refer to technical effects of the first aspect and various possible implementations of the first aspect. Details are not described herein again.

An embodiment of the present disclosure provides an apparatus. The apparatus exists in a product form of a chip, and a structure of the apparatus includes a processor and a memory. The memory is configured to: be coupled to the processor, and store a program instruction and data that are necessary for the apparatus. The processor is configured to execute the program instruction stored in the memory, so that the apparatus executes a function of the user equipment in the foregoing method.

An embodiment of the present disclosure provides a user equipment. The user equipment may implement a function executed by the user equipment in the foregoing method embodiments, and the function may be implemented by hardware, or may be implemented by hardware by executing corresponding software. The hardware or the software includes one or more modules corresponding to the foregoing function.

In an embodiment, a structure of the user equipment includes a processor and a communications interface. The processor is configured to support the user equipment in executing a corresponding function in the foregoing method. The communications interface is configured to support communication between the user equipment and another network element. The user equipment may further include a memory, and the memory is configured to: be coupled to the processor, and store a program instruction and data that are necessary for the user equipment.

An embodiment of the present disclosure provides a computer-readable storage medium, including an instruction, where when the instruction is run on a computer, the computer is enabled to perform any method provided in the first aspect.

An embodiment of the present disclosure provides a computer program product including an instruction, where when the computer program product is run on a computer, the computer is enabled to perform any method provided in the first aspect.

An embodiment of the present disclosure provides a repeated transmission method, including: sending, by a network device, configuration information of a power control parameter to a user equipment, where the configuration information of the power control parameter includes a power control parameter of a reference signal, the power control parameter of the reference signal is used to determine a transmit power of a first reference signal used to demodulate first transmission in repeated transmission and a transmit power of a second reference signal used to demodulate another time of transmission in the repeated transmission, and the power control parameter of the reference signal enables the sending power of the first reference signal to be greater than the transmit power of the second reference signal; and receiving, by the network device, uplink data transmission sent by the user equipment based on the configuration information of the power control parameter and a reference signal used to demodulate the uplink data transmission.

In the prior art, initial transmission of a user equipment collides with retransmission of another user equipment, and this may reduce detection reliability of the initial transmission of the user equipment. Consequently, a probability of successful decoding of the user equipment is reduced. Compared with the prior art, in this embodiment of this disclosure, a transmit power of a reference signal initially transmitted by the user equipment is greater than a transmit power of a retransmitted reference signal. For each user equipment, impact of a reference signal retransmitted by the another user equipment on the reference signal initially transmitted by the user equipment is reduced, thereby increasing a probability of successful decoding performed by the network device on the reference signal initially transmitted by the user equipment, that is, increasing a probability of successful decoding of the user equipment.

An embodiment of the present disclosure provides a network device, including: a sending unit, configured to send configuration information of a power control parameter to a user equipment, where the configuration information of the power control parameter includes a power control parameter of a reference signal, the power control parameter of the reference signal is used to determine a transmit power of a first reference signal used to demodulate first transmission in repeated transmission and a transmit power of a second reference signal used to demodulate another time of transmission in the repeated transmission, and the power control parameter of the reference signal enables the sending power of the first reference signal to be greater than the transmit power of the second reference signal; and a receiving unit, configured to receive uplink data transmission sent by the user equipment based on the configuration information of the power control parameter and a reference signal used to demodulate the uplink data transmission.

An embodiment of the present disclosure provides a network device. The network device may implement a function executed by the network device in the foregoing method embodiments, and the function may be implemented by hardware, or may be implemented by hardware by executing corresponding software. The hardware or the software includes one or more modules corresponding to the foregoing function.

In a possible design, a structure of the network device includes a processor and a communications interface. The processor is configured to support the network device in executing a corresponding function in the foregoing method. The communications interface is configured to support communication between the network device and another network element. The network device may further include a memory, and the memory is configured to: be coupled to the processor, and store a program instruction and data that are necessary for the network device.

An embodiment of the present disclosure provides a computer-readable storage medium, including an instruction, where when the instruction is run on a computer, the computer is enabled to perform any method provided in the seventh aspect.

An embodiment of the present disclosure provides a computer program product including an instruction, where when the computer program product is run on a computer, the computer is enabled to perform any method provided in the seventh aspect.

DESCRIPTION OF EMBODIMENTS

Embodiments of this disclosure provide a repeated transmission method and an apparatus. The method and the apparatus are applied to a repeated transmission process, for example, applied to an uplink transmission process of a user equipment in a grant-free mode.

Figure 1:
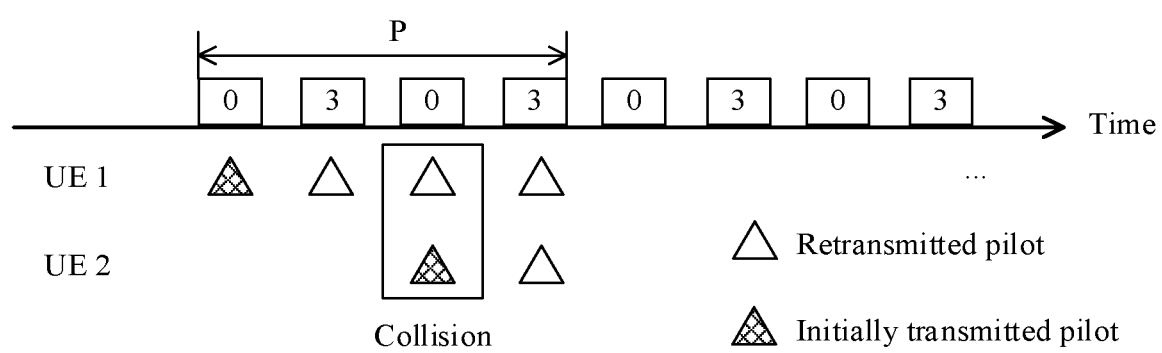
FIG. 1 is a schematic diagram of a collision between initial transmission and retransmission.
Figure 2:
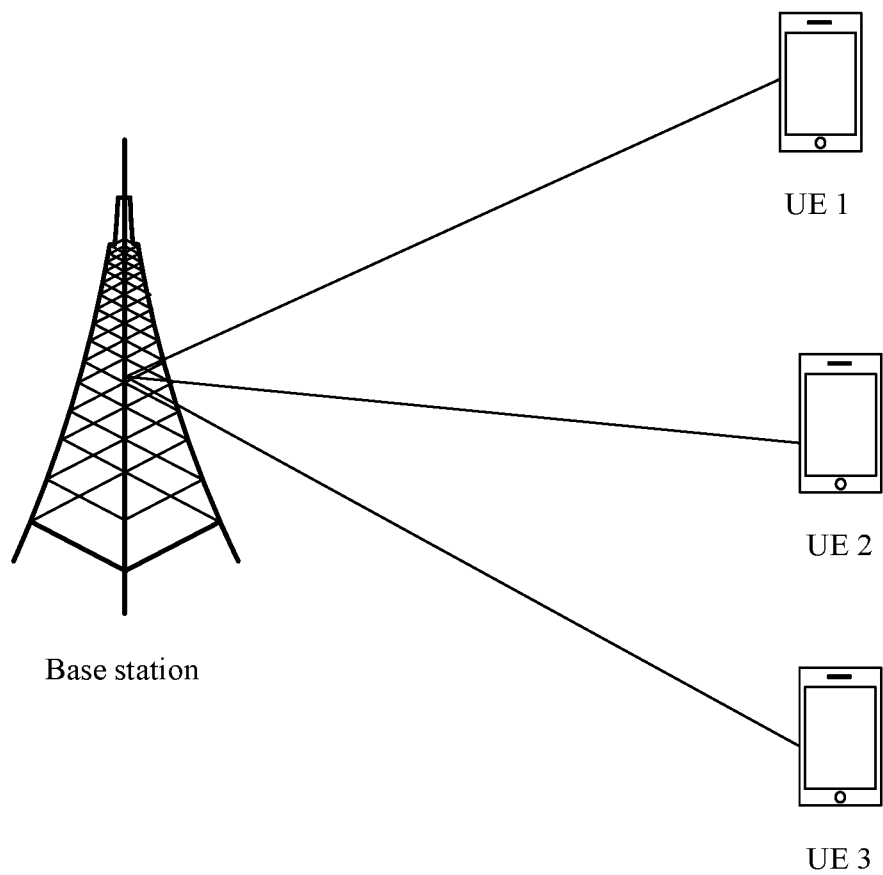
FIG. 2 is a schematic architectural diagram of a communications system according to an embodiment of this disclosure.

FIG. 2 is a schematic architectural diagram of a communications system according to an embodiment of this disclosure. The communications system includes a network device (for example, a base station) and a plurality of user equipments (for example, a UE 1, a UE 2, and a UE 3). Each user equipment is configured to: perform first transmission of uplink data, and send a first reference signal based on a first transmit power, where the first reference signal is used to demodulate the first transmission of the uplink data; and perform $N^{th}$ transmission of the uplink data, and send a second reference signal to the network device based on a second transmit power, where N is an integer greater than or equal to 2, and the second reference signal is used to demodulate the $N^{th}$ transmission of the uplink data. It may be understood that the first transmission of the uplink data is initial transmission of the uplink data, and the first reference signal sent based on the first transmit power is an initially transmitted reference signal. The $N^{th}$ transmission of the uplink data is $(N-1)^{th}$ retransmission of the uplink data, and the second reference signal sent to the network device based on the second transmit power is a reference signal retransmitted at the $(N-1)^{th}$ time.

The base station may be a device that can communicate with the user equipment. The base station may be a relay station, an access point, or the like. The base station may be a base transceiver station (BTS) in a global system for mobile communications (GSM) or in a code division multiple access (CDMA) network, or may be an NB (NodeB) in wideband code division multiple access (WCDMA), or may be an eNB or an eNodeB (evolutional NodeB) in LTE. Alternatively, the base station may be a radio controller in a cloud radio access network (CRAN) scenario. Alternatively, the base station may be a base station in a 5G network or a base station in a future evolved network, or may be a wearable device, a vehicle-mounted device, or the like.

The user equipment may be a terminal device that provides a user with voice and/or other service data connectivity, or a handheld device with a wireless connection function, or another processing device connected to a wireless modem. The wireless terminal may be a device such as a portable, pocket-sized, computer built-in, or vehicle-mounted mobile apparatus, or may be a personal communication service (PCS) phone, a cordless phone, a session initiation protocol (SIP) phone set, a wireless local loop (WLL) station, or a personal digital assistant (PDA). This is not limited herein. A wired terminal may communicate with an access network device and a core network device in a communication form of using an overhead electric line and cable engineering (including an overhead, underground, and underwater cable, and an optical cable) as communication conduction. The wired terminal includes a wired telephone, a wired television, and a broadband computer. The wired telephone includes a family fixed-line phone or an enterprise fixed-line phone. The wired television includes a community antenna television (community antenna television, CATV), an internet protocol television (IPTV), a network television, and the like.

The following describes the technical solutions in the embodiments of this disclosure with reference to the accompanying drawings in the embodiments of this disclosure. To clearly describe the technical solutions in the embodiments of this disclosure, terms such as "first" and "second" are used in the embodiments of this disclosure to distinguish between same items or similar items that have basically same functions and purposes. Persons skilled in the art may understand that the terms such as "first" and "second" do not constitute a limitation on a quantity or an execution sequence, and that the terms such as "first" and "second" do not indicate a definite difference.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It should be noted that, in the embodiments of the present disclosure, "of (of)", "corresponding (corresponding, relevant)", and "corresponding (corresponding)" may be interchangeably used sometimes. It should be noted that meanings expressed by the terms are consistent when differences are not emphasized.

Figure 3:
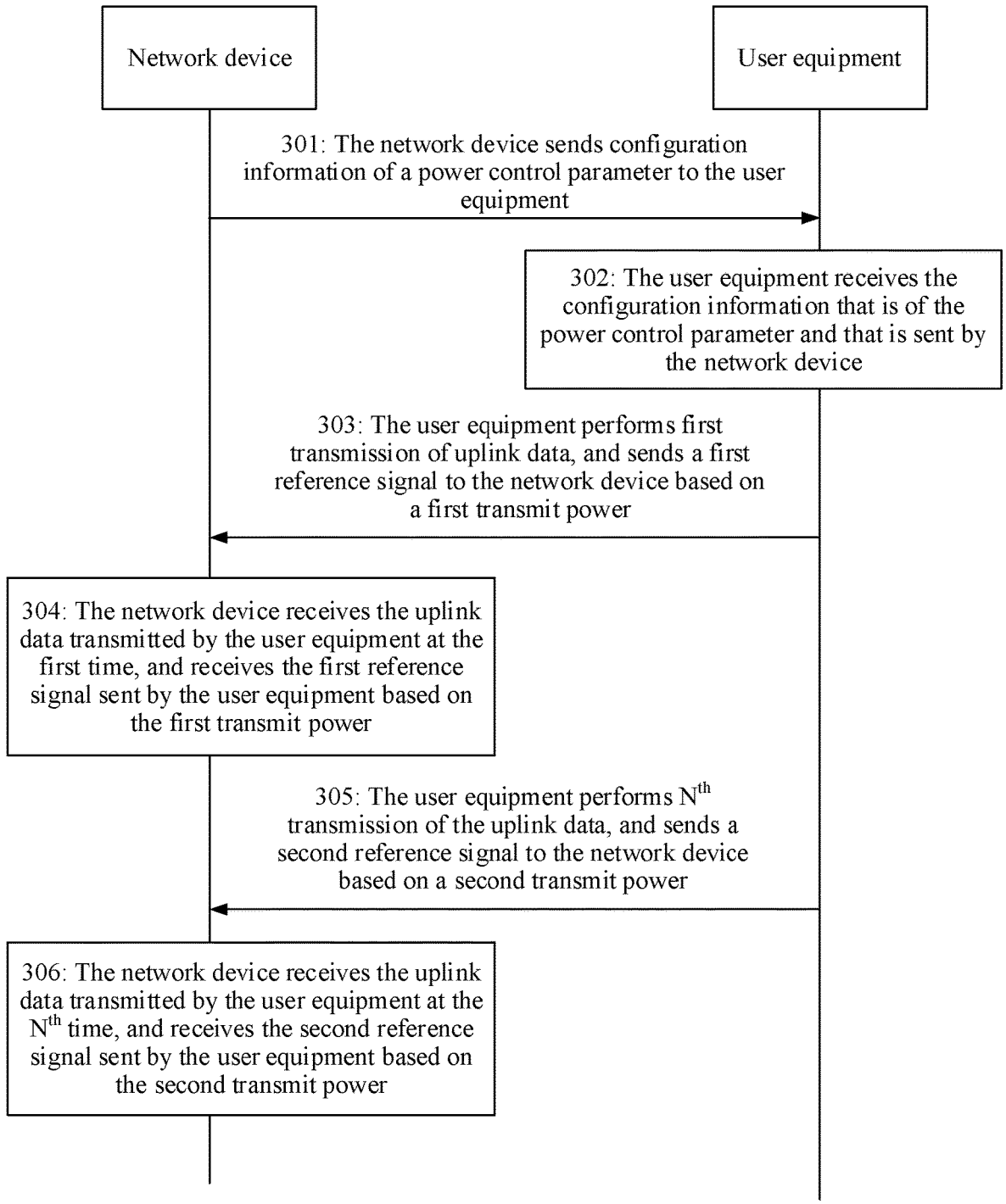
FIG. 3 is a schematic diagram of signal interaction in a repeated transmission method according to an embodiment of this disclosure.

As shown in FIG. 3, an embodiment of this disclosure provides a repeated transmission method, including the following blocks.

301: A network device sends configuration information of a power control parameter to a user equipment.

The configuration information of the power control parameter includes a power control parameter of a reference signal, the power control parameter of the reference signal is used to determine a transmit power of a first reference signal used to demodulate first transmission in repeated transmission and a transmit power of a second reference signal used to demodulate another time of transmission in the repeated transmission, and the power control parameter of the reference signal enables the sending power of the first reference signal to be greater than the transmit power of the second reference signal.

302: The user equipment receives the configuration information that is of the power control parameter and that is sent by the network device.

303: The user equipment performs first transmission of uplink data, and sends the first reference signal to the network device based on a first transmit power, where the first reference signal is used to demodulate the first transmission of the uplink data.

In a possible design, the first transmit power is determined based on a maximum transmit power of the user equipment, an expected target power value, an open-loop power control parameter, a power offset value (offset) of a modulation and coding scheme (MCS), and a closed-loop power control adjustment amount that are of an uplink channel, and transmission bandwidth allocated to the user equipment. The expected target power value of the uplink channel is determined based on a first parameter, a cell reference power, and a power offset of the user equipment, and the first parameter is used to determine a value of the power offset of the user equipment, so that a value of the first transmit power can be adjusted.

In a possible design, the user equipment may perform the first transmission of the uplink data on a physical uplink shared channel (PUSCH) channel, and send the first reference signal based on the first transmit power. In this case, the first transmit power may be a smaller value between the maximum transmit power of the UE and a UE configured transmit power The UE configured transmit power may be determined based on the expected target power value that is of the PUSCH and that is configured by using higher layer signaling, the open-loop power control parameter (including a path loss compensation factor and a path loss estimated by using a pilot), the power offset value corresponding to the MCS, the transmission bandwidth allocated to the UE, and a closed-loop power control adjustment amount.

For example, when the first parameter corresponding to the first transmit power is $\gamma$, a calculation formula of the first transmit power $P_{PUSCH,f,c}(i, j, q_d, l)$ s shown in a formula (1):

$$P_{PUSCH,f,c}(i, j, q_d, l) = \min \left\{ \begin{array}{l} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{array} \right\}, \text{where} \quad (1)$$

$$P_{O\_PUSCH,f,c}(j) = P_{O\_NOMINAL\_PUSCH,f,c}(j) + P_{O\_UE\_PUSCH,f,c}(j, \gamma).$$

$P_{CMAX,f,c}(i)$ is a maximum transmit power of the user equipment in a transmission time unit i; f indicates different carriers; c indicates a sequence number of a serving cell; $P_{O\_PUSCH,f,c}(j)$ is an expected receive power of the network device (for example, a base station); and different values of j indicate indexes configured for different scheduling manners or different parameter sets. For example, j=0 is applicable to transmission of a physical random access channel (PRACH), j=1 is applicable to a grant-free transmission mode, and j=2, J is applicable to a grant-based transmission mode. $P_{O\_NOMINAL\_PUSCH,f,c}(j)$ is a reference power of the serving cell; $P_{O\_UE\_PUSCH,f,c}(j,\gamma)$ is a power offset of the user equipment; $M_{RB,f,c}^{PUSCH}$ is transmission bandwidth that is of the PUSCH and that is allocated to the user equipment; $\mu$ indicates different subcarrier spacing parameters; $\alpha_{f,c}(j)$ and $PL_{f,c}(q_d)$ indicate open-loop power control parameters, where $\alpha_{f,c}(j)$ indicates a path loss compensation factor, and $PL_{f,c}(q_d)$ indicates a path loss estimated by using a pilot indicated by a parameter $q_d$; $q_d$ indicates a type of a pilot measurement resource; $\Delta_{TF,f,c}(i)$ indicates a power offset value corresponding to the MCS; $f_{f,c}(i, l)$ indicates a closed-loop power control adjustment amount; and/indicates that closed-loop power control selects a parameter based on modes of different types of carriers.

In a possible design, the first transmit power is determined based on a second parameter, the maximum transmit power of the user equipment, the expected target power value, the open-loop power control parameter, the power offset value of the MCS, and the closed-loop power control adjustment amount that are of the uplink channel, and the transmission bandwidth allocated to the user equipment. The second parameter is determined by the user equipment or the network device.

In a possible design, a value of another parameter that affects the first transmit power may be adjusted by using a third parameter, to further adjust the value of the first transmit power. This is not limited in this embodiment of this disclosure.

When the user equipment performs the first transmission of the uplink data on the PUSCH channel, and sends the first reference signal based on the first transmit power, the first transmit power may be a smaller value between the maximum transmit power of the UE and the UE configured transmit power. The UE configured transmit power may be determined based on the expected target power values that are of the second parameter and the PUSCH and that are configured by using the higher layer signaling, the open-loop power control parameter, the power offset value corresponding to the MCS, the transmission bandwidth allocated to the UE, and the closed-loop power control adjustment amount. The open-loop power control parameter includes the path loss compensation factor and the path loss estimated by using the pilot.

For example, when the second parameter corresponding to the first transmit power is $\beta$, a calculation formula of the first transmit power $P_{PUSCH,f,c}(i, j, q_d, l)$ is shown in a formula (2):

$$P_{PUSCH,f,c}(i, j, q_d, l) = \min\left\{\begin{array}{l} P_{CMAX,f,c}(i), \\ \beta + P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{array}\right\} \quad (2)$$

For parameters in the formula (2), refer to related descriptions of the parameters in the formula (1). Details are not described herein again.

In a possible design, values of the first parameter and the second parameter may be determined by the user equipment, or may be configured by the network device by using signaling, for example, configured by using an RRC message and/or DCI. The value of the first parameter or the second parameter may correspond to a specific value or correspond to a value set, and the set includes a plurality of values.

In addition, the user equipment may control the first transmission of the uplink data based on a third transmit power. It should be noted that the first transmit power is the same as the third transmit power, or the first transmit power is greater than the third transmit power. To be specific, a transmit power corresponding to a reference signal used to demodulate the first transmission of the uplink data may be the same as a transmit power corresponding to the first transmission of the uplink data, or a transmit power corresponding to a reference signal used to demodulate the first transmission of the uplink data is greater than a transmit power corresponding to the first transmission of the uplink data. For a calculation manner of the third transmit power, refer to the foregoing calculation manner of the first transmit power.

Specifically, when the first transmit power is greater than the third transmit power, the value of the first parameter corresponding to the first transmit power is different from a value of a first parameter corresponding to the third transmit power, and a base station-expected receive power corresponding to the first transmit power is greater than a base station-expected receive power corresponding to the third transmit power. Alternatively, the value of the second parameter corresponding to the first transmit power is greater than a value of a second parameter corresponding to the third transmit power. For example, the value of the second parameter corresponding to the first transmit power is greater than 0, and the value of the second parameter corresponding to the third transmit power is less than 0 or equal to 0. Because the base station demodulates the first transmission of the uplink data based on the first transmit power of the reference signal, the first transmit power is greater than the third transmit power, so that the network device better demodulates the first transmission of the uplink data.

In a possible case, when the first transmit power is the same as the third transmit power, a power boosting factor of the first transmit power may be used to boost the first transmit power, so that the first transmit power is greater than the third transmit power of the uplink data. For example, when the first reference signal is a demodulation reference signal (DMRS) symbol, the power boosting factor of the first transmit power may be used to boost a transmit power of the DMRS symbol, so that the first transmit power of the DMRS symbol is equal to or greater than the third transmit power of the uplink data. In this case, the user equipment may use, for power boosting, a resource element (RE) in a code division multiplexing (CDM) group that is not occupied by uplink data of another user equipment. One CDM group is a set of pilot ports that use CDM on a same time-frequency resource. In other words, a value of the power boosting factor may be determined based on the RE in the CDM group that is not occupied by the uplink data.

For example, a calculation formula of the power boosting factor of the first transmit power is shown in a formula (3):

$$\rho = \frac{PUSCH\ EPRE}{DMRS\ EPRE}\ (dB) = -10 \cdot \log_{10}Q\ (dB), \quad (3)$$

where

EPRE indicates energy per resource element. A value of Q is determined based on a quantity of CDM groups that are not occupied by the uplink data of the another user equipment.

Figure 4:
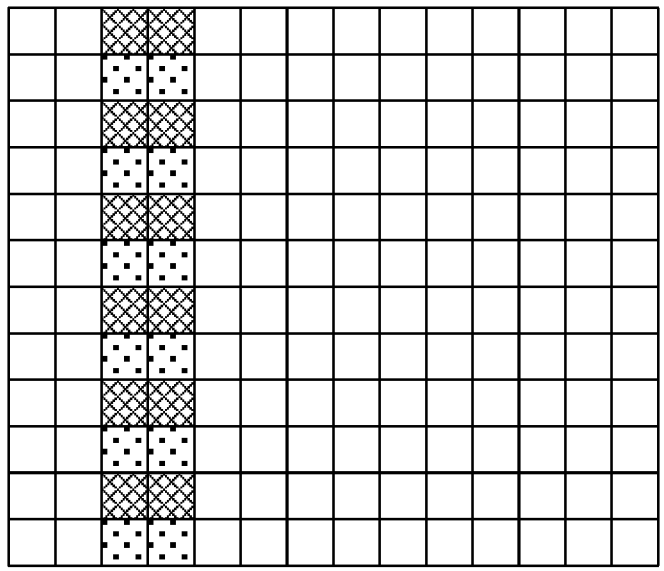
FIG. 4 is a schematic diagram of CDM groups corresponding to different types of DMRS patterns according to an embodiment of this disclosure.
Figure 4:
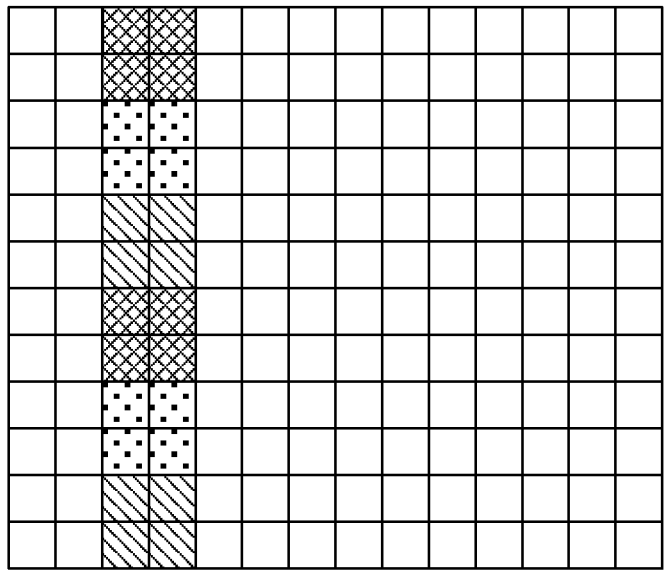

Currently, 5G supports two types of DMRS patterns. As shown in FIG. 4(a), for a first type of DMRS pattern, two CDM groups are supported, and Q may have two values: 1 and 2. $\rho$ may have two values: 0 and −3. It is assumed that a DMRS symbol sent by a user equipment A occupies a CDM group 0, if a CDM group 1 is occupied by uplink data of another user equipment, for the user equipment A, Q=1, and $\rho$=0 dB, in other words, the CDM group 1 cannot be used by the user equipment A to perform power boosting on the first transmit power for transmitting the DMRS symbol. If the CDM group 1 is not occupied by uplink data of another user equipment, for the user equipment A, Q=2, and $\rho$=−3 dB. In this case, the CDM group 1 may be used by the user equipment A to perform power boosting on the first transmit power for transmitting the DMRS symbol. As shown in FIG. 4(b), for a second type of DMRS pattern, three CDM groups are supported, and $\rho$ may have three values: 0, −3, and −4.77. It is assumed that the DMRS symbol sent by the user equipment A occupies the CDM group 0, if the CDM group 1 and a CDM group 2 are occupied by uplink data of another user equipment, for the user equipment A, Q=1, and $\rho$=0 dB, in other words, the CDM group 1 and the CDM group 2 cannot be used by the user equipment A to perform power boosting on the first transmit power for transmitting the DMRS symbol. If the CDM group 1 or the CDM group 2 is not occupied by uplink data of another user equipment, for the user equipment A, Q=2, and $\rho$=−3 dB, in other words, the CDM group 1 or the CDM group 2 may be used for power boosting. If neither the CDM group 1 nor the CDM group 2 is occupied by uplink data of another user equipment, for the user equipment A, Q=3, and $\rho$=−4.77 dB, in other words, both the CDM group 1 and the CDM group 2 may be used for power boosting.

304: The network device receives the uplink data transmitted by the user equipment at the first time, and receives the first reference signal sent by the user equipment based on the first transmit power.

The network device may receive, based on the third transmit power, the uplink data transmitted by the user equipment at the first time, and receive the first reference signal sent by the user equipment based on the first transmit power.

305: The user equipment performs $N^{th}$ transmission of the uplink data, and sends a second reference signal to the network device based on a second transmit power, where N is an integer greater than or equal to 2, and the second reference signal is used to demodulate the $N^{th}$ transmission of the uplink data.

The second transmit power is less than the first transmit power. To be specific, a power of a reference signal used to demodulate the $N^{th}$ transmission of the uplink data is less than the power of the reference signal used to demodulate the first transmission of the uplink data. In this way, impact of the reference signal used to demodulate the $N^{th}$ transmission of the uplink data on the reference signal used to demodulate the first transmission of the uplink data is reduced, so that detection reliability of the reference signal initially transmitted by the user equipment can be improved, thereby increasing a probability of successful decoding of initial transmission of the user equipment.

For a method for determining the second transmit power by the user equipment, refer to the method for determining the first transmit power in block 303. It should be noted that a value of a first parameter corresponding to the second transmit power is different from the value of the first parameter corresponding to the first transmit power, and a power offset of the user equipment corresponding to the second transmit power is less than a power offset of the user equipment corresponding to the first transmit power. Alternatively, a value of a second parameter corresponding to the second transmit power is less than the value of the second parameter corresponding to the first transmit power. Alternatively, when the first transmit power performs power boosting by using the power boosting factor, the second transmit power does not perform power boosting by using the power boosting factor. Therefore, a transmit power of the reference signal initially transmitted by the user equipment is greater than a transmit power of a reference signal retransmitted by another user equipment, and this reduces impact of the reference signal retransmitted by the another user equipment on the reference signal initially transmitted by the user equipment, thereby increasing a probability of successful decoding of the reference signal initially transmitted by the user equipment, that is, increasing a probability of successful decoding of the initial transmission of the user equipment.

The user equipment may control the $N^{th}$ transmission of the uplink data based on a fourth transmit power, where the fourth transmit power is the same as or different from the third transmit power. To be specific, the transmit power corresponding to the first transmission of the uplink data may be the same as or different from a transmit power corresponding to the $N^{th}$ transmission of the uplink data. For a calculation manner of the fourth transmit power, refer to the calculation manner of the first transmit power in block 303.

In a possible design, the third transmit power is greater than the fourth transmit power. Specifically, a value of a first parameter corresponding to the third transmit power is different from a value of a first parameter corresponding to the fourth transmit power, and the power offset of the user equipment corresponding to the second transmit power is less than the power offset of the user equipment corresponding to the first transmit power. Alternatively, a value of a second parameter corresponding to the third transmit power is greater than a value of a second parameter corresponding to the fourth transmit power. Because the decoding reliability of the initial transmission of the user equipment is the highest, the transmit power corresponding to the first transmission is greater than the transmit power corresponding to the $N^{th}$ transmission of the uplink data, so that the network device better receives the first transmission of the uplink data.

In a possible design, the fourth transmit power is the same as the second transmit power, or the second transmit power is less than the fourth transmit power. To be specific, the transmit power corresponding to the $N^{th}$ transmission of the uplink data may be the same as the transmit power corresponding to the reference signal used to demodulate the $N^{th}$ transmission of the uplink data, or the transmit power corresponding to the reference signal used to demodulate the $N^{th}$ transmission of the uplink data is less than the transmit power corresponding to the $N^{th}$ transmission of the uplink data. Therefore, a smaller second transmit power can better reduce impact of a retransmitted reference signal on an initially transmitted reference signal, so that another user equipment better performs the first transmission of the uplink data, thereby improving the decoding reliability of initial transmission performed by the network device on the another user equipment, and improving system communication efficiency.

In a possible design, the second transmit power is determined based on power boosting factors of the fourth transmit power and the second transmit power. For a calculation manner of the power boosting factor of the second transmit, refer to the calculation manner of the power boosting factor of the first transmit power in block 303.

In a possible design, the user equipment performs $(N+1)^{th}$ transmission of the uplink data, and sends a third reference signal based on a fifth transmit power, where the third reference signal is used to demodulate the $(N+1)^{th}$ transmission of the uplink data. The fifth transmit power is the same as or different from the second transmit power. To be specific, a transmit power corresponding to a reference signal used to demodulate the $(N+1)^{th}$ transmission of the uplink data may be the same as or different from the transmit power corresponding to the reference signal used to demodulate the $N^{th}$ transmission of the uplink data. For a method for determining the fifth transmit power and the second transmit power by the user equipment, refer to the method for determining the first transmit power in block 303.

Figure 5:
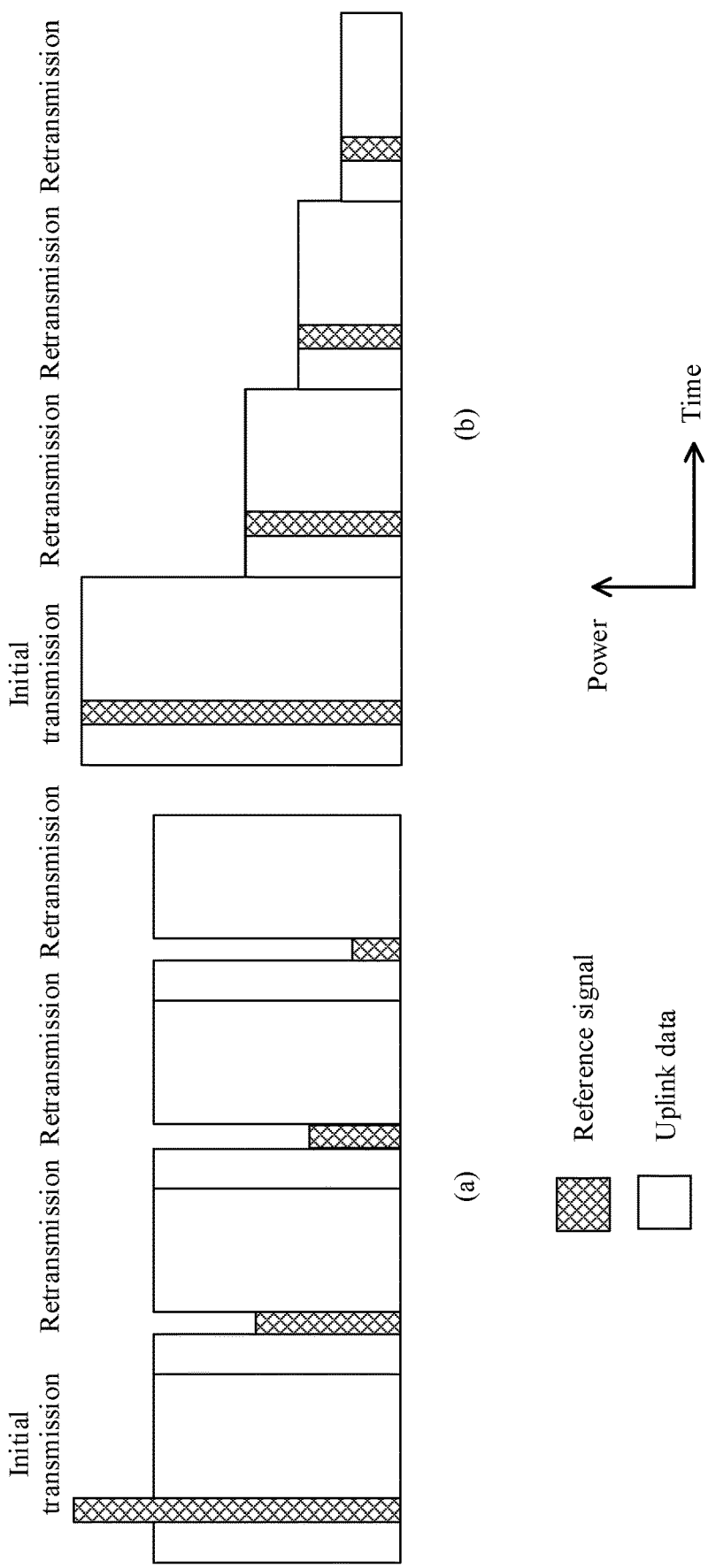
FIG. 5 is a schematic diagram of performing initial transmission and retransmission on uplink data and a reference signal by a UE according to an embodiment of this disclosure.

In a possible design, the fifth transmit power is less than the second transmit power. For example, as shown in FIG. 5(*a*), a transmit power of a reference signal retransmitted at the second time is less than a transmit power of a reference signal retransmitted at the first time, and a transmit power of a reference signal retransmitted at the third time is less than the transmit power of the reference signal retransmitted at the second time. It should be noted that, when the fifth transmit power is less than the second transmit power, a value of a first parameter corresponding to the fifth transmit power is different from the value of the first parameter corresponding to the second transmit power, and a power offset of the user equipment corresponding to the fifth transmit power is less than the power offset of the user equipment corresponding to the second transmit power. Alternatively, a value of a second parameter corresponding to the fifth transmit power is less than the value of the second parameter corresponding to the second transmit power. Therefore, compared with the impact of the reference signal retransmitted based on the second transmit power on the initially transmitted reference signal, impact of a reference signal retransmitted based on the fifth transmit power on the initially transmitted reference signal is smaller, so that the network device better receives first transmission of uplink data of another user equipment, and can improve decoding reliability of the initial transmission of the another user equipment, thereby improving the system communication efficiency.

In a possible design, the user equipment performs the $(N+1)^{th}$ transmission of the uplink data based on a sixth transmit power. The sixth transmit power is the same as or different from the fourth transmit power. To be specific, a transmit power the uplink data transmitted at the $(N+1)^{th}$ time may be the same as or different from a transmit power of the uplink data transmitted at the $N^{th}$ time. For a method for determining the sixth transmit power by the user equipment, refer to the method for determining the first transmit power in block 303.

In a possible design, the sixth transmit power is less than the fourth transmit power. In addition, the sixth transmit power may be the same as the fifth transmit power. For example, as shown in FIG. 5(b), a transmit power of uplink data retransmitted at the second time is less than a transmit power of uplink data retransmitted at the first time, and a transmit power of uplink data retransmitted at the third time is less than the transmit power of uplink data retransmitted at the second time.

In a possible design, a sending power of a reference signal corresponding to $i^{th}$ transmission of the uplink data is determined based on a redundancy version number used for the $i^{th}$ transmission of the uplink data, where i=1, . . . , K, and K is a maximum quantity of times of repeated transmission. That is, there may be a correspondence (a binding relationship) between different redundancy version numbers and different sending powers.

For example, when an RV sequence is {0, 3, 0, 3}, a sending power of a reference signal transmitted at the first time by the user equipment on an RV 0 is greater than a sending power of a reference signal transmitted on an RV 3. When the RV sequence is {0, 2, 3, 1}, the sending power of the reference signal transmitted at the first time by the user equipment on the RV 0 is greater than the sending power of the reference signal transmitted on an RV 1, an RV 2, or the RV 3. It may be understood that a redundancy version number used for the first transmission is the RV 0, a redundancy version number used for the second, . . . , or $K^{th}$ transmission may be the RV 1, the RV 2, or the RV 3.

In this way, a value of the sending power of the reference signal corresponding to the $i^{th}$ transmission may be determined based on the redundancy version number used for the $i^{th}$ transmission of the uplink data, to ensure that the transmit power of the reference signal initially transmitted by the user equipment is greater than the transmit power of the retransmitted reference signal. For each user equipment, impact of the reference signal retransmitted by another user equipment on the reference signal initially transmitted by the user equipment is reduced, thereby increasing the probability of successful decoding of the reference signal initially transmitted by the user equipment, that is, increasing the probability of successful decoding of the user equipment.

306: The network device receives the uplink data transmitted by the user equipment at the $N^{th}$ time, and receives the second reference signal sent by the user equipment based on the second transmit power.

The network device may receive, based on the fourth transmit power, the uplink data transmitted by the user equipment at the $N^{th}$ time, and receive the second reference signal sent by the user equipment based on the second transmit power.

In a possible design, the network device may receive, based on the fifth transmit power, the uplink data transmitted by the user equipment at the $(N+1)^{th}$ time, and receive the second reference signal sent by the user equipment based on the second transmit power.

In the prior art, initial transmission of one user equipment collides with retransmission of another user equipment, and this may reduce detection reliability of the initial transmission of the user equipment. Consequently, the probability of successful decoding of the user equipment is reduced. Compared with the prior art, in this embodiment of this disclosure, a transmit power of a reference signal initially transmitted by each user equipment is greater than a transmit power of a retransmitted reference signal. For each user equipment, impact of a reference signal retransmitted by the user equipment on the reference signal initially transmitted by the another user equipment is reduced, thereby increasing the probability of successful decoding performed by the network device on the reference signal initially transmitted by the another user equipment, and increasing the system communication efficiency.

Figure 6:
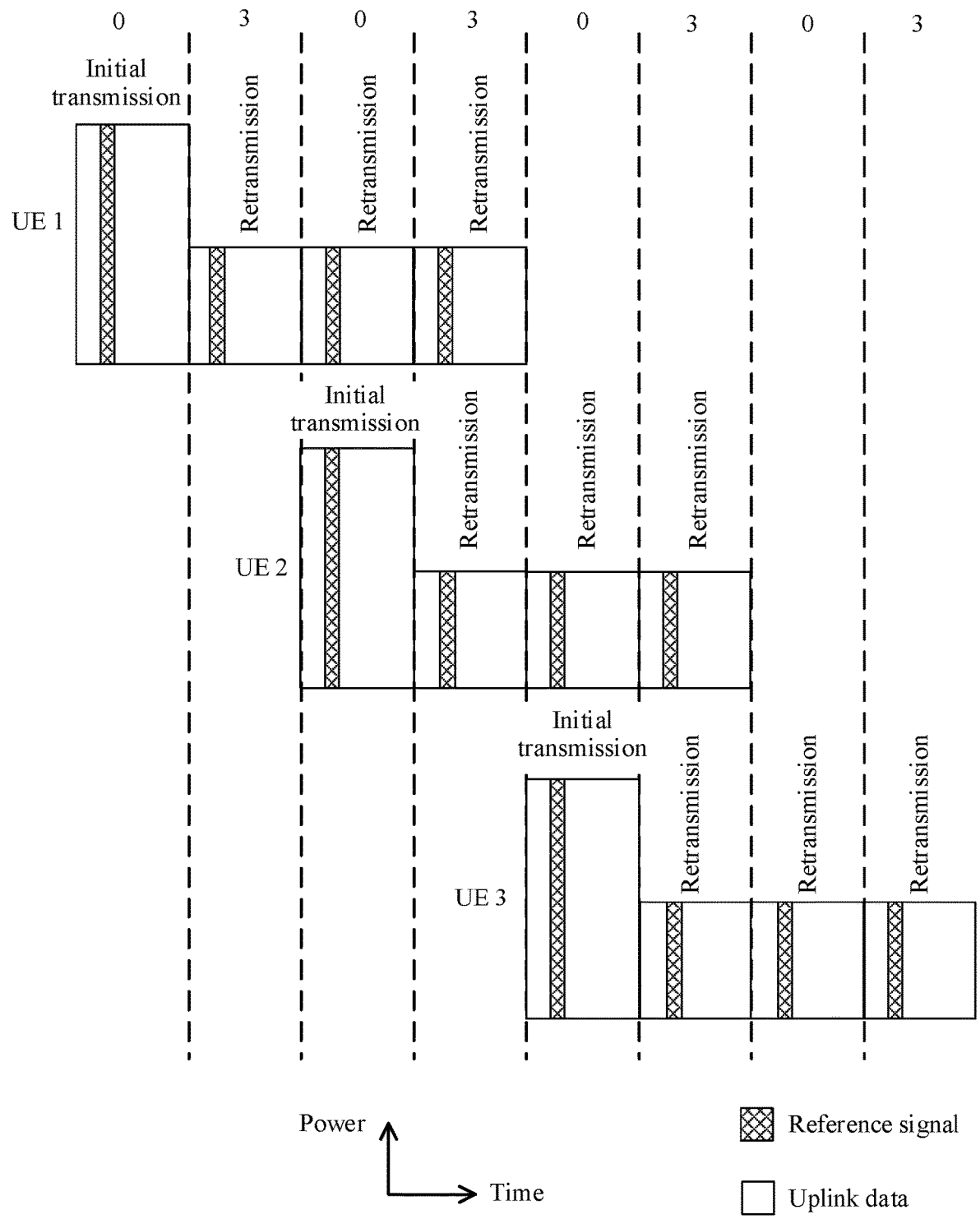
FIG. 6 is a schematic diagram 1 of performing initial transmission and retransmission on uplink data and a reference signal by a plurality of UEs according to an embodiment of this disclosure.
Figure 7:
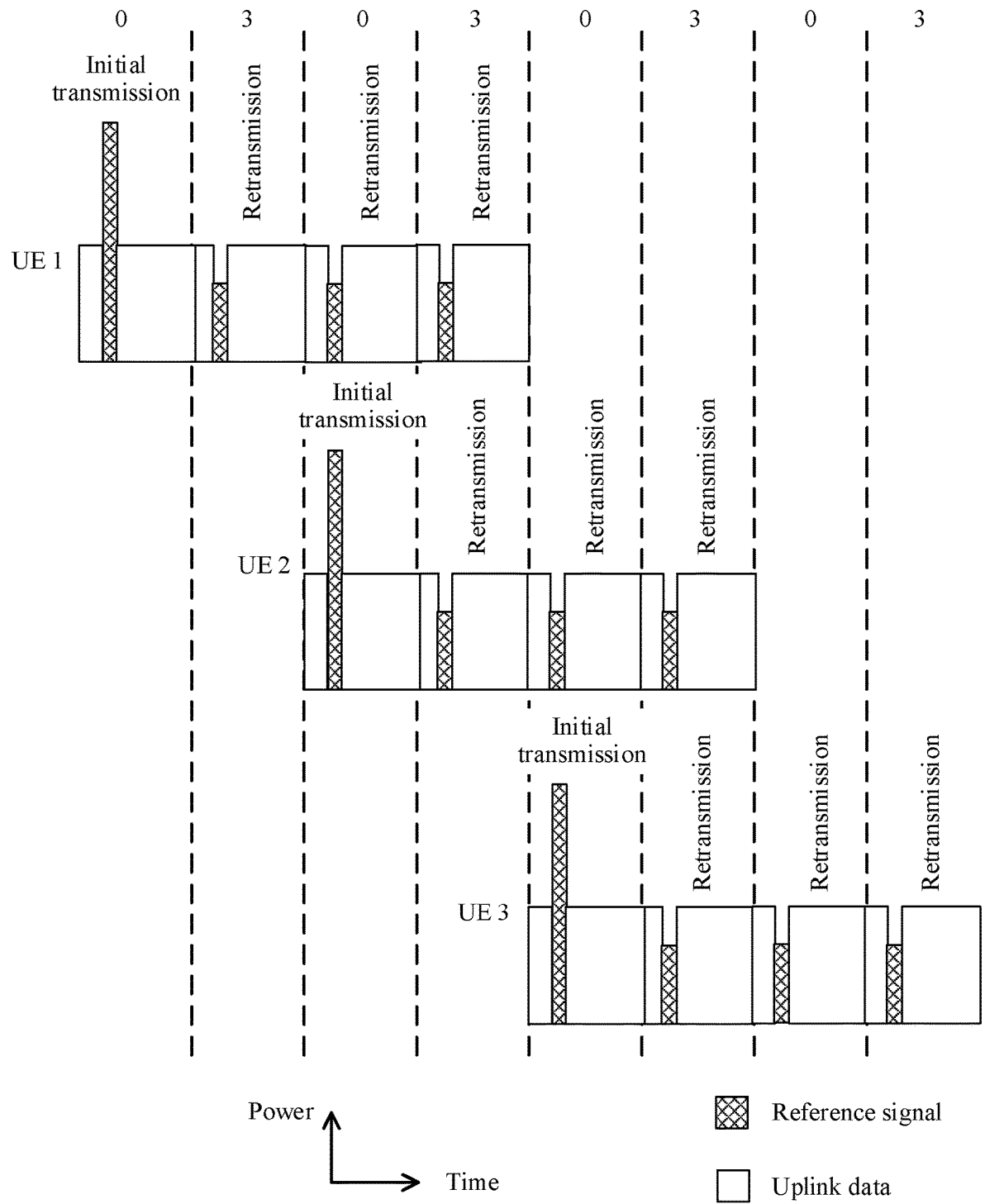
FIG. 7 is a schematic diagram 2 of performing initial transmission and retransmission on uplink data and a reference signal by a plurality of UEs according to an embodiment of this disclosure.

For example, if a UE 1, a UE 2, and a UE 3 each correspond to an RV sequence {0, 3, 0, 3}, when the first transmit power is greater than the second transmit power, the first transmit power is the same as the third transmit power, and the second transmit power is the same as the fourth transmit power, FIG. 6 is a schematic diagram in which the UE 1, the UE 2, and the UE 3 perform the first transmission of the uplink data and send the first reference signal, and perform the $N^{th}$ transmission of the uplink data and send the second reference signal to the network device, where N is 2, 3, or 4, and the height of each graph in the figure indicates a power value. When the first transmit power is greater than the second transmit power, the first transmit power is greater than the third transmit power, and the second transmit power is less than the fourth transmit power, FIG. 7 is a schematic diagram in which the UE 1, the UE 2, and the UE 3 perform the first transmission of the uplink data and send the first reference signal, and perform the $N^{th}$ transmission of the uplink data and send the second reference signal to the network device. It can be learned from FIG. 6 and FIG. 7 that, the transmit power of the reference signal of the user equipment that sends the initial transmission is greater than the transmit power of the reference signal of the user equipment that sends the retransmission. For example, a transmit power of a reference signal initially transmitted by the UE 2 is greater than a transmit power of a reference signal retransmitted by the UE 1, or a transmit power of a reference signal initially transmitted by the UE 3 is greater than a transmit power of a reference signal retransmitted by the UE 2, so that impact of the reference signal retransmitted by the UE 1 on the reference signal initially transmitted by the UE 2, or impact of the reference signal retransmitted by the UE 2 on the reference signal initially transmitted by the UE 3 is reduced, thereby increasing the probability of successful decoding performed by the network device on the initial transmission of the UE 2 or the UE 3.

The foregoing mainly describes the solutions provided in the embodiments of this disclosure from perspectives of the user equipment and the network device. It may be understood that to implement the foregoing functions, the user equipment and the network device include corresponding hardware structures and/or software modules for performing the functions. Persons skilled in the art should be easily aware that, algorithm blocks described with reference to the embodiments disclosed in this specification can be implemented by hardware or a combination of hardware and computer software in this disclosure. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this disclosure.

In the embodiments of this disclosure, the user equipment and the network device may be divided into function modules based on the foregoing method examples. For example, the function modules may be obtained through division based on corresponding functions, or two or more functions may be integrated into one processing module. The foregoing integrated module may be implemented in a form of hardware, or may be implemented in a form of a software function module. It should be noted that, in the embodiments of this disclosure, module division is merely an example, and is merely a logical function division. In actual implementation, another division manner may be used.

Figure 8:
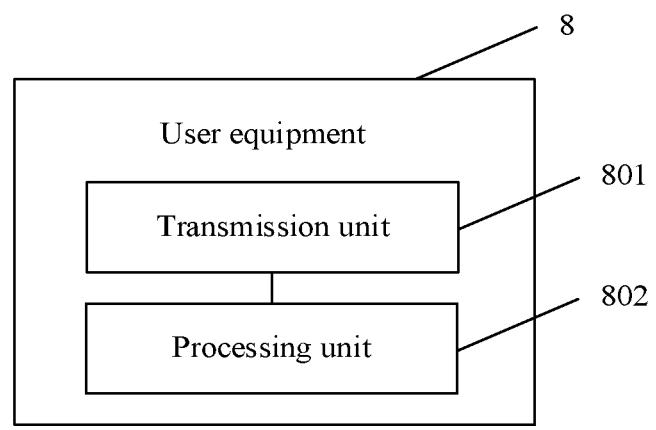
FIG. 8 is a schematic structural diagram 1 of a user equipment according to an embodiment of this disclosure.

When the function modules are obtained through division based on corresponding functions, FIG. 8 is a possible schematic structural diagram 1 of a user equipment 8 in the foregoing embodiment. The user equipment includes a transmission unit 801 and a processing unit 802. In this embodiment of this disclosure, the transmission unit 801 may be configured to: perform first transmission of uplink data, and send a first reference signal to a network device based on a first transmit power, where the first reference signal is used to demodulate the first transmission of the uplink data; and perform $N^{th}$ transmission of the uplink data, and send a second reference signal to the network device based on a second transmit power, where N is an integer greater than or equal to 2, the second reference signal is used to demodulate the $N^{th}$ transmission of the uplink data, and the second transmit power is less than the first transmit power. The processing unit 802 is configured to determine the second transmit power and the first transmit power. The transmission unit 801 and the processing unit 802 are configured to support the user equipment in performing the processes 303 and 305 in FIG. 3.

Figure 9:
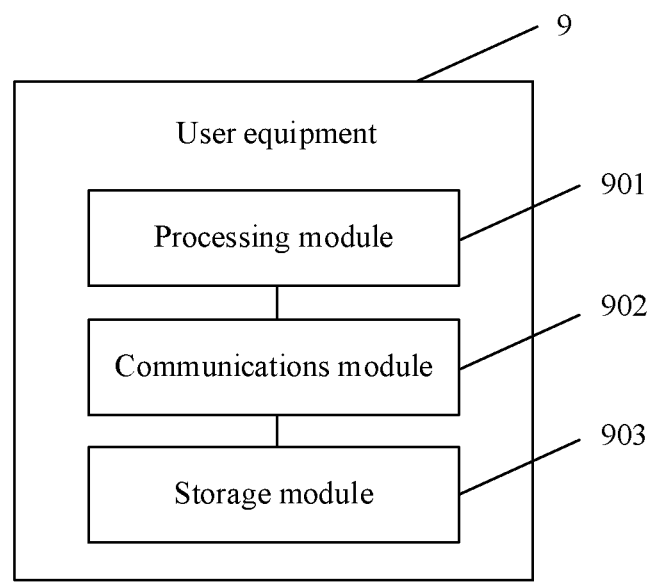
FIG. 9 is a schematic structural diagram 2 of a user equipment according to an embodiment of this disclosure.

When an integrated unit is used, FIG. 9 is a possible schematic structural diagram 2 of a user equipment 9 in the foregoing embodiment. In this disclosure, the user equipment may include a processing module 901, a communications module 902, and a storage module 903. The processing module 901 is configured to control hardware apparatuses, application software, and the like of the user equipment. The communications module 902 is configured to: accept an instruction and/or data sent by another device, or send data of the user equipment to another device. The storage module 903 is configured to store a software program of the user equipment, store data, run software, and the like. The processing module 901 may be a processor or a controller, for example, may be a central processing unit (CPU), a general purpose processor, a digital signal processor (DSP), an application-specific integrated circuit (ASIC), a field programmable gate array (FPGA), or another programmable logical device, a transistor logical device, a hardware component, or any combination thereof. The processor 901 may implement or execute various example logical blocks, modules, and circuits described with reference to content disclosed in this disclosure. Alternatively, the processor may be a combination of processors implementing a computing function, for example, a combination including one or more microprocessing units, or a combination of a DSP and a microprocessing unit. The communications module 902 may be a transceiver, a transceiver circuit, a communications interface, or the like. The storage module 903 may be a memory.

Figure 10:
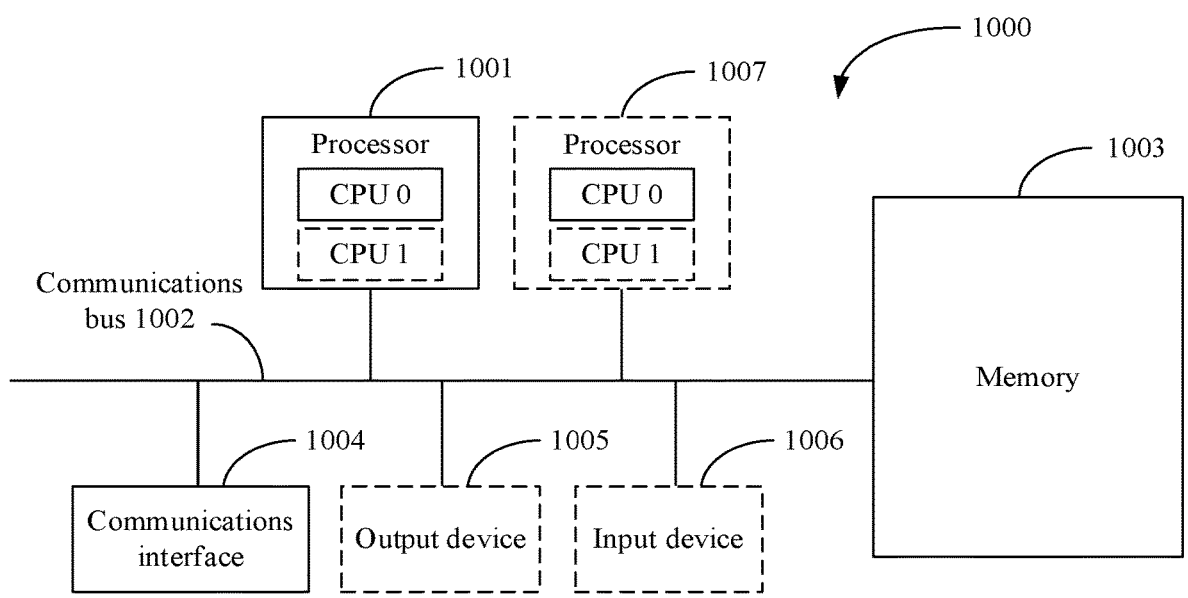
FIG. 10 is a schematic diagram of a structure according to an embodiment of this application.

In a possible design, the user equipment may be implemented by using a structure (an apparatus or a system) in FIG. 10.

FIG. 10 is a schematic diagram of a structure according to an embodiment of this disclosure. A structure 1000 includes at least one processor 1001, a communications bus 1002, a memory 1003, and at least one communications interface 1004.

The processor 1001 may be a CPU, a microprocessing unit, an ASIC, or one or more integrated circuits configured to control program execution in the solutions of this disclosure.

The communications bus 1002 may include a path for transferring information between the foregoing components.

The communications interface 1004 that uses any apparatus such as a transceiver is configured to communicate with another device or a communications network, for example, Ethernet, a radio access network (RAN), or a wireless local area network (WLAN).

The memory 1003 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a blue optical disc, and the like), a magnetic disk storage medium or another magnetic storage device, or any other medium that can carry or store expected program code in an instruction or data structure form and can be accessed by a computer. However, this is not limited herein. The memory may exist independently, or may be connected to the processor by using the bus. The memory may alternatively be integrated with the processor.

The memory 1003 is configured to store application program code for performing the solutions of this disclosure, and execution of the solutions is controlled by the processor 1001. The processor 1001 is configured to execute the application program code stored in the memory 1003, to implement a function in the method in this patent.

During specific implementation, in an embodiment, the processor 1001 may include one or more CPUs, such as a CPU 0 and a CPU 1 in FIG. 10.

During specific implementation, in an embodiment, the structure 1000 may include a plurality of processors, for example, the processor 1001 and a processor 1007 in FIG. 10. Each of the processors may be a single-core processor (single-CPU) or a multi-core processor (multi-CPU). The processors herein may be one or more devices, circuits, and/or processing cores for processing data (for example, a computer program instruction).

During specific implementation, in an embodiment, the structure 1000 may further include an output device 1005 and an input device 1006. The output device 1005 communicates with the processor 1001, and may display information in a plurality of manners. For example, the output device 1005 may be a liquid crystal display (LCD), a light emitting diode (LED) display device, a cathode ray tube (CRT) display device, or a projector. The input device 1006 communicates with the processor 1001, and may accept input of a user in a plurality of manners. For example, the input device 1006 may be a mouse, a keyboard, a touchscreen device, or a sensing device.

In specific implementation, the structure 1000 may be a desktop computer, a portable computer, a network server, a palmtop computer (PDA), a mobile phone, a tablet computer, a wireless terminal device, a communications device, an embedded device, or a device with a structure similar to that in FIG. 10. A type of the structure 1000 is not limited in this embodiment of this disclosure.

Figure 11:
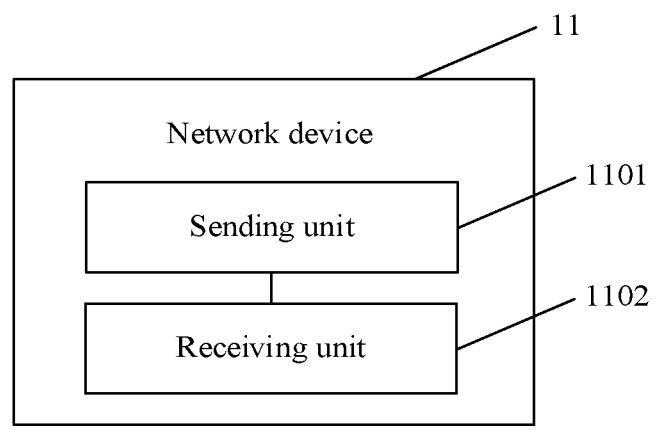
FIG. 11 is a schematic structural diagram 1 of a network device according to an embodiment of this disclosure.

When the function modules are obtained through division based on corresponding functions, FIG. 11 is a possible schematic structural diagram 1 of a network device 11 in the foregoing embodiment. The network device includes a sending unit 1101 and a receiving unit 1102. In this embodiment of this disclosure, the sending unit 1101 is configured to send configuration information of a power control parameter to a user equipment, where the configuration information of the power control parameter includes a power control parameter of a reference signal, the power control parameter of the reference signal is used to determine a transmit power of a first reference signal used to demodulate first transmission in repeated transmission and a transmit power of a second reference signal used to demodulate another time of transmission in the repeated transmission, and the power control parameter of the reference signal enables the sending power of the first reference signal to be greater than the transmit power of the second reference signal; and the receiving unit 1102 is configured to receive uplink data transmission sent by the user equipment based on the configuration information of the power control parameter and a reference signal used to demodulate the uplink data transmission. The sending unit 1101 is configured to support the network device in performing the process 301 in FIG. 3. The receiving unit 1102 is configured to support the network device in performing processes 304 and 306 in FIG. 3.

Figure 12:
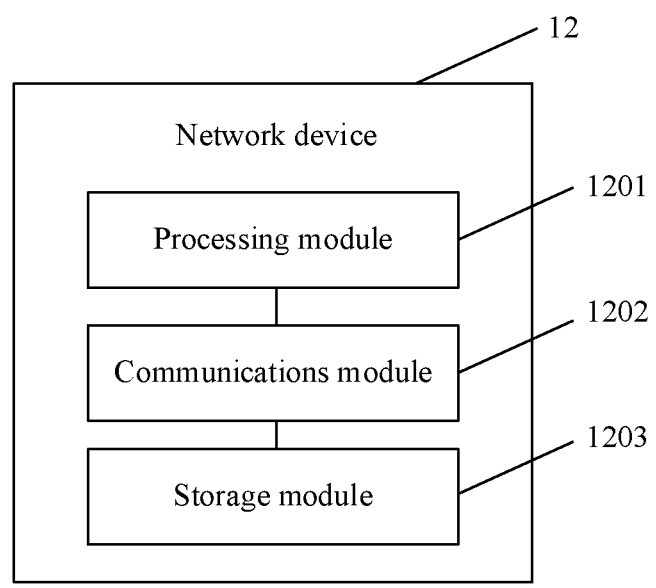
FIG. 12 is a schematic structural diagram 2 of a network device according to an embodiment of this disclosure.

When an integrated unit is used, FIG. 12 is a possible schematic structural diagram 2 of a network device 12 in the foregoing embodiment. In this disclosure, the network device may include a processing module 1201, a communications module 1202, and a storage module 1203. The processing module 1201 is configured to control hardware apparatuses, disclosure software, and the like of the network device. The communications module 1202 is configured to: accept an instruction sent by another device, or send data of the network device to another device. The storage module 1203 is configured to store a software program of the network device, store data, run software, and the like. The processing module 1201 may be a processor or a controller, for example, may be a CPU, a general purpose processor, a DSP, an ASIC, an FPGA, or another programmable logic device, a transistor logic device, a hardware component, or any combination thereof. The processing module 1201 may implement or execute various example logical blocks, modules, and circuits described with reference to content disclosed in this disclosure. Alternatively, the processor may be a combination of processors implementing a computing function, for example, a combination including one or more microprocessing units, or a combination of a DSP and a microprocessing unit. The communications module 1202 may be a transceiver, a transceiver circuit, a communications interface, or the like. The storage module 1203 may be a memory.

Figure 13:
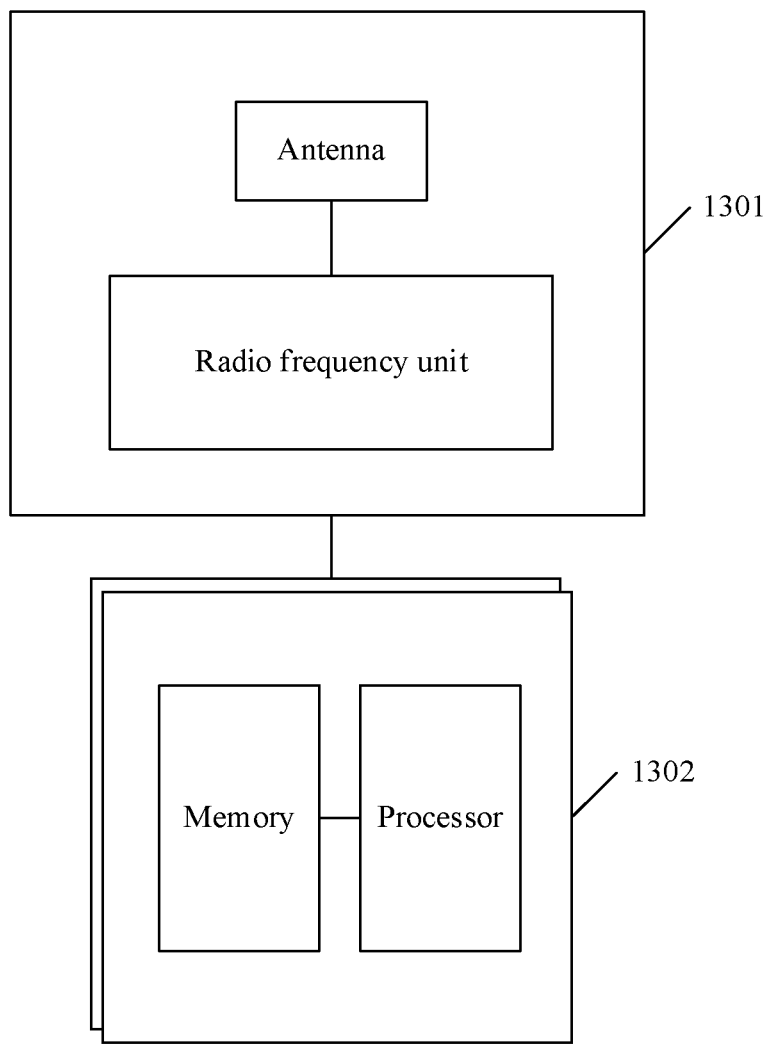
FIG. 13 is a schematic structural diagram of a base station according to an embodiment of this disclosure.

In a possible design, the network device may be implemented by using a base station in FIG. 13.

FIG. 13 is a schematic structural diagram of a base station according to an embodiment of this disclosure. The base station includes a part 1301 and a part 1302. The part 1301 of the base station is mainly configured to: receive/send a radio frequency signal, and perform conversion between a radio frequency signal and a baseband signal. The part 1302 of the base station is mainly configured to: perform baseband processing, control the base station, and the like. The part 1301 may usually be referred to as a transceiver unit, a transceiver machine, a transceiver circuit, a transceiver, or the like. The part 1302 is usually a control center of the base station, and may be usually referred to as a processing unit, configured to control the base station to perform the blocks performed by the base station (that is, a serving base station) in FIG. 3. For details, refer to the foregoing descriptions of the related parts.

The transceiver unit in the part 1301 may also be referred to as a transceiver machine, a transceiver, or the like. The transceiver unit includes an antenna and a radio frequency unit. The radio frequency unit is mainly configured to perform radio frequency processing. Optionally, a component that is in the part 1301 and that is configured to implement a reception function may be considered as a receiving unit, and a component that is configured to implement a transmission function may be considered as a sending unit, that is, the part 1301 includes the receiving unit and the sending unit. The receiving unit may also be referred to as a receiver, a receiver, a receiver circuit, or the like. The sending unit may be referred to as a transmitter, a transmitter, a transmitter circuit, or the like.

The part 1302 may include one or more boards. Each board may include one or more processors and one or more memories. The processor is configured to read and execute a program in the memory, to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors. The memory and the processor may be integrated together, or may be disposed independently. In some embodiments, the part 1301 and the part 1302 may be integrated together, or may be disposed independently. In addition, all functions of the part 1302 may be integrated into one chip for implementation, or some functions may be integrated into one chip for implementation and some other functions are integrated into one or more other chips for implementation. This is not limited in this disclosure.

Persons of skill in the art should be aware that in one or more of the foregoing examples, the functions described in this disclosure may be implemented by using hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general purpose or dedicated computer.

The objectives, technical solutions, and benefits of this disclosure are further described in detail in the foregoing specific embodiments. It should be understood that the foregoing descriptions are merely specific embodiments of this disclosure, but are not intended to limit the protection scope of this disclosure. Any modification, equivalent replacement or improvement made based on technical solutions of this disclosure shall fall within the protection scope of this disclosure.

Persons skilled in the art should understand that the embodiments of this disclosure may be provided as a method, a system, or a computer program product. Therefore, the embodiments of this disclosure may use a form of hardware only embodiments, software only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and blocks are performed on the computer or the another programmable device, thereby generating computer-implemented processing. Therefore, the instructions executed on the computer or the another programmable device provide blocks for implementing a specific function in one or more processes in the flowcharts and/or in one or more blocks in the block diagrams.

Definitely, persons skilled in the art can make various modifications and variations to embodiments of this disclosure without departing from the spirit and scope of this disclosure. This disclosure is intended to cover the modifications and variations provided that they fall within the scope of protection defined by the following claims and their equivalent technologies.

What is claimed is:

1. A method, comprising:
    performing, by a user equipment, a first transmission of uplink data;
    sending a first reference signal to a network device based on a first transmit power, wherein the first reference signal is used to demodulate the first transmission of the uplink data;
    performing, by the user equipment, a $N^{th}$ transmission of the uplink data; and
    sending a second reference signal to the network device based on a second transmit power that is less than the first transmit power, wherein:
        N is an integer greater than or equal to 2, the second reference signal is used to demodulate the $N^{th}$ transmission of the uplink data; and
        controlling, by the user equipment, the first transmission of the uplink data based on a third transmit power, wherein the first transmit power is determined based on power boosting factors of the third transmit power and the first transmit power.

2. The method of claim 1, comprising:
    controlling, by the user equipment, the $N^{th}$ transmission of the uplink data based on a fourth transmit power, wherein
    the third transmit power is the same as or different from the fourth transmit power.

3. The method of claim 2, wherein the first transmit power is the same as the third transmit power, or the first transmit power is greater than the third transmit power.

4. The method of claim 2, wherein the second transmit power is the same as the fourth transmit power, or the second transmit power is less than the fourth transmit power.

5. The method of claim 1, wherein the method further comprises:
    performing, by the user equipment, a $(N+1)^{th}$ transmission of the uplink data, and sending a third reference signal based on a fifth transmit power, wherein the third reference signal is used to demodulate the $(N+1)^{th}$ transmission of the uplink data, and
    the fifth transmit power is the same as or different from the second transmit power.

6. The method of claim 1, wherein:
    the first transmit power is determined based on one or more of a maximum transmit power of the user equipment, an expected target power value, an open-loop power control parameter, a power offset value of a modulation and coding scheme MCS, and a closed-loop power control adjustment amount that are of an uplink channel, and transmission bandwidth allocated to the user equipment; and
    the expected target power value of the uplink channel is determined based on a first parameter, a cell reference power, and a power offset of the user equipment, and the first parameter is used to determine a value of the power offset of the user equipment.

7. The method of claim 1, wherein:
    the first transmit power is determined based on one or more of a second parameter, a maximum transmit power of the user equipment, an expected target power value, an open-loop power control parameter, a power offset value of a modulation and coding scheme MCS, and a closed-loop power control adjustment amount that are of an uplink channel, and transmission bandwidth allocated to the user equipment; and the second parameter is determined by the user equipment or the network device.

8. The method of claim 2, wherein:
    the second transmit power is determined based on power boosting factors of the fourth transmit power and the second transmit power.

9. The method of claim 1, wherein
    a sending power of a reference signal corresponding to $i^{th}$ transmission of the uplink data is determined based on a redundancy version number used for the $i^{th}$ transmission of the uplink data, wherein i=1, ..., K, and K is a maximum quantity of times of repeated transmission.

10. A method, comprising:

sending, by a network device, configuration information of a power control parameter to a user equipment, wherein the configuration information of the power control parameter comprises a power control parameter of a reference signal, the power control parameter of the reference signal is used to determine a first transmit power of a first reference signal used to demodulate first transmission in repeated transmission and a second transmit power of a second reference signal used to demodulate another time of transmission in the repeated transmission, and the power control parameter of the reference signal enables the first transmit power of the first reference signal to be greater than the second transmit power of the second reference signal; and receiving, by the network device, uplink data transmission sent by the user equipment based on the configuration information of the power control parameter and a reference signal used to demodulate the uplink data transmission, wherein the uplink data transmission is based on a third transmit power and the first transmit power is based on power boosting factors of the third transmit power and the first transmit power.

11. An apparatus, comprising:

a transmitter, configured to:
  perform first transmission of uplink data;
  send a first reference signal to a network device based on a first transmit power determined by a processor, wherein the first reference signal is used to demodulate the first transmission of the uplink data;
  perform $N^{th}$ transmission of the uplink data, and send a second reference signal to the network device based on a second transmit power that is less than the first transmit power and is determined by the processor, wherein N is an integer greater than or equal to 2, the second reference signal is used to demodulate the $N^{th}$ transmission of the uplink data; and
  control the first transmission of the uplink data based on a third transmit power, wherein the first transmit power is determined based on power boosting factors of the third transmit power and the first transmit power.

12. The apparatus of claim 11, wherein
the transmitter is configured to control the $N^{th}$ transmission of the uplink data based on a fourth transmit power determined by the processor, wherein
the third transmit power is the same as or different from the fourth transmit power.

13. The apparatus of claim 12, wherein the first transmit power is the same as the third transmit power, or the first transmit power is greater than the third transmit power.

14. The apparatus of claim 12, wherein the second transmit power is the same as the fourth transmit power, or the second transmit power is less than the fourth transmit power.

15. The apparatus of claim 11, wherein the transmitter is further configured to:
  transmit a $(N+1)^{th}$ transmission of the uplink data, and send a third reference signal based on a fifth transmit power determined by the processor, wherein the third reference signal is used to demodulate the $(N+1)^{th}$ transmission of the uplink data, and
  the fifth transmit power is the same as or different from the second transmit power.

16. The apparatus of claim 11, wherein:
the first transmit power is determined based on one or more of a maximum transmit power of the apparatus, an expected target power value, an open-loop power control parameter, a power offset value of a modulation and coding scheme MCS, and a closed-loop power control adjustment amount that are of an uplink channel, and transmission bandwidth allocated to the apparatus; and
the expected target power value of the uplink channel is determined based on one or more of a first parameter, a cell reference power, and a power offset of the apparatus, and the first parameter is used to determine a value of the power offset of the apparatus.

17. The apparatus of claim 11, wherein:
the first transmit power is determined based on one or more of a second parameter, a maximum transmit power of the apparatus, an expected target power value, an open-loop power control parameter, a power offset value of a modulation and coding scheme MCS, and a closed-loop power control adjustment amount that are of an uplink channel, and transmission bandwidth allocated to the apparatus; and the second parameter is determined by the apparatus or the network device.

18. The apparatus of claim 12, wherein:
the second transmit power is determined based on power boosting factors of the fourth transmit power and the second transmit power.

19. The apparatus of claim 11, wherein:
a sending power of a reference signal corresponding to $i^{th}$ transmission of the uplink data is determined based on a redundancy version number used for the $i^{th}$ transmission of the uplink data, wherein i=1, ..., K, and K is a maximum quantity of times of repeated transmission.

* * * * *